(12) United States Patent  
Contreras et al.

(10) Patent No.: US 8,804,263 B1
(45) Date of Patent: Aug. 12, 2014

(54) DC-OFFSET ADJUSTMENT FOR BALANCED EMBEDDED CONTACT SENSOR

(71) Applicant: HGST Netherlands B.V., Amsterdam (NL)

(72) Inventors: John Contreras, Palo Alto, CA (US); Samir Y. Garzon, Sunnyvale, CA (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/015,716

(22) Filed: Aug. 30, 2013

(51) Int. Cl.
*G11B 5/09* (2006.01)
(52) U.S. Cl.
USPC .............................................. 360/46; 360/67
(58) Field of Classification Search
None
See application file for complete search history.

(56) References Cited

U.S. PATENT DOCUMENTS

| | | | |
|---|---|---|---|
| 6,091,557 A * | 7/2000 | Hashizume | 360/46 |
| 7,016,139 B2 | 3/2006 | Baumgart et al. | |
| 8,085,490 B2 | 12/2011 | Franca-Neto et al. | |
| 8,300,346 B2 | 10/2012 | Ikeda et al. | |
| 8,325,442 B2 | 12/2012 | Koui et al. | |
| 8,351,155 B2 | 1/2013 | Contreras et al. | |
| 8,638,349 B1 * | 1/2014 | Liu et al. | 346/78 |
| 2005/0088772 A1 * | 4/2005 | Baumgart et al. | 360/75 |
| 2009/0059418 A1 | 3/2009 | Takeo et al. | |
| 2011/0038080 A1 | 2/2011 | Alex et al. | |
| 2011/0205667 A1 | 8/2011 | Yamada et al. | |
| 2011/0235207 A1 * | 9/2011 | Yang | 360/75 |
| 2012/0099218 A1 | 4/2012 | Kurita et al. | |
| 2013/0163110 A1 * | 6/2013 | Garzon et al. | 360/75 |
| 2013/0188273 A1 * | 7/2013 | Miyamoto et al. | 360/59 |

* cited by examiner

*Primary Examiner* — Paul Huber
(74) *Attorney, Agent, or Firm* — G. Marlin Knight

(57) ABSTRACT

Embedded contact sensor controls for use in arm electronics (AE) in a disk drive are described that provide for removing undesirable offsets between the measured voltage across the ECS resistor in the slider and the balance resistor in ECS amplifier in the arm electronics (AE), which allows increased amplification of the resulting adjusted signal without saturation. Embodiments include a Zero-Offset Circuit, which can be activated periodically or on demand to sample and hold the present DC offset voltage in the ECS amplifier signal and subtract the DC offset voltage from ECS amplifier signal. The adjusted signal can then be further amplified without saturation.

20 Claims, 3 Drawing Sheets

DC-OFFSET ADJUSTMENT FOR BALANCED EMBEDDED CONTACT SENSOR

RELATED APPLICATION

The present application is related to commonly assigned application titled "BALANCED EMBEDDED CONTACT SENSOR WITH LOW NOISE ARCHITECTURE" bearing Ser. No. 13/333,518 with a filing date of Dec. 21, 2011, which is incorporated by reference herein. The related application was published as US20130163110 on Jun. 27, 2013.

FIELD OF THE INVENTION

Embodiments of the invention relate to systems and methods for generating and processing signals from sliders in disk drives and more particularly to generating and processing signals from embedded contact sensors in sliders.

BACKGROUND

A prior art disk drive 10, see FIG. 1, typically includes a main integrated circuit, which is typically called a system on a chip (SOC) 11 that contains many of the electronics and firmware for the drive. Each disk (not shown) can have thin film magnetic material on each of the planar surfaces. Each recording surface normally has a dedicated pair of read and write heads packaged in a slider 13 that is mechanically positioned over the rotating disk by an actuator (not shown). The actuators also provide the electrical connections to the slider components. The actuators also contain the arm electronics (AE) chip 12 which typically include preamps for the read heads, write drivers and fly-height controls. A flex cable connects the SOC 11 to the AE 12. The AE typically include digital and analog circuitry that control the signals sent to components in the slider and process the signals received from the slider components. The AE can include registers that are set using serial data from the SOC to provide parameters for the AE functions. The write driver generates an analog signal that is applied to the inductive coil in the write head to write data by selectively magnetizing portions of the magnetic material on the surface of the rotating disk.

As the disk rotates under the slider, the slider is said to "fly" above the disk although the spacing is quite small and contact can occur. Controlling the fly-height is an important part of the design. Fly-height control circuitry 14 interfaces with fly-height components 15 in the slider. Thermal fly-height control (TFC) is one prior art control technique that uses a heater element (not shown) disposed in the slider. The fly-height can be adjusted by heating the slider with the heater. Electrical current supplied to the heater by fly-height control circuitry 14 generates heat to thermally expand the slider and modulate the fly-height. The fly-height components 15 can also include other elements in addition to the heater.

Published U.S. patent application 20120099218 by Kurita, et al. (Apr. 26, 2012) describes a magnetic-recording head used in a hard disk drive with a thermal fly-height control (TFC) element and an embedded contact sensor element configurable as a second TFC element. The heater element is configured as a TFC element to coarsely adjust the fly-height. The embedded contact sensor is configured to detect contact with the magnetic-recording disk, and to function as a second heater element that provides fine adjustment of the fly-height.

A fly-height control system can also include embedded contact sensors (ECS) 17 in the slider along the associated ECS Control circuitry 16 in the AE. Resistor temperature detectors (RTD) in the sliders have been used in the prior art to determine when the read/write head makes physical contact with the magnetic-recording disk based upon changes in the temperature of the slider when contact occurs. RTD architectures can use a single temperature sensor that measures temperature based on the amount of voltage across a single temperature sensor. Published U.S. patent application 20130176643 by Contreras, et al. Jul. 11, 2013, which is commonly assigned with the present application, describes a distributed temperature detector architecture in a head disk interface system of a hard-disk drive (HDD). The slider can include a first temperature sensor that is located relatively near an air bearing surface (ABS) and a second temperature sensor that is offset from the ABS. The read/write IC is configured to detect when the slider makes physical contact with a disk based on a difference in temperature measured by the first and second temperature sensor. The first and second temperature sensors form a bridge circuit, such as a Wheatstone bridge, with a first IC resistor and a second IC resistor that both reside in the read/write IC, allowing the temperature of the read/write head to be accurately measured.

A balanced embedded contact sensor with low noise architecture is described in published U.S. patent application 20130163110 which is commonly assigned with the present application and listed as a related application above. In one embodiment a slider having a resistive temperature detector (RTD) is used with AE circuitry that includes a balance resistor having the same resistance as the RTD when the slider is not in physical contact with the disk. Equal current flows through the RTD and the balance resistor to allow the voltage change across the RTD to be used as a measure of physical contact between the head slider. In an alternate embodiment, the slider includes two RTDs connected in series, and the balance resistor may possess the same resistance as the two series RTDs. The two RTDs may be designed to vary inversely with environmental changes to avoid the need to recalibrate the balance resistor after any environmental change.

A balanced amplifier with DC capability and low noise is needed for a balanced Embedded Contact Sensor (bECS) system. However, temperature changes in ECS in the slider due to write currents, TFC operation, and ambient temperature fluctuations, can add an undesired offset to the ECS tracking signal which is not properly balanced in and which limits the gain of the bECS amplifier.

SUMMARY OF THE INVENTION

Embodiments of the invention provide means and methods for removing undesirable offsets between the measured voltage across the ECS resistor in the slider and the balance resistor in ECS amplifier in the arm electronics (AE), which allows increased amplification of the resulting adjusted signal without saturation.

Embodiments include a Zero-Offset Circuit, which is activated on demand to sample and hold the present DC offset voltage in the ECS amplifier signal and subtract the DC offset voltage from ECS amplifier signal. The adjusted signal can then be further amplified. In one embodiment the Zero-Offset Circuit includes a differential unity gain amplifier which has the ECS amplifier signal connected to its positive input and the DC output of the sample and hold circuit as its negative input. In this embodiment the output of a low pass filter connected to the output of the differential unity gain amplifier feeds the sample and hold circuit.

In embodiments the Zero-Offset Circuit includes a register that holds the DC offset value. In embodiments the register can be read and written by the SOC allowing control by and providing information to other system components including the channel function in the SOC.

DETAILED DESCRIPTION OF THE INVENTION

Figure 1:
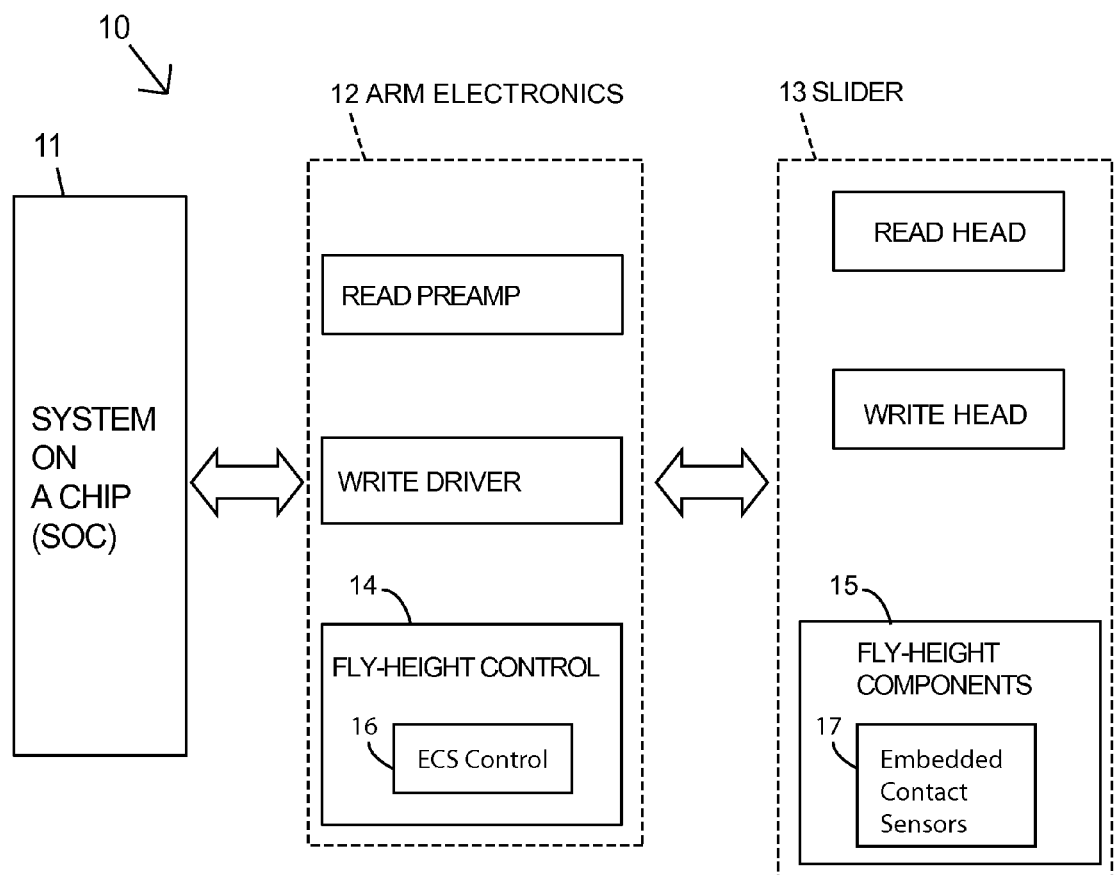
FIG. 1 is a block illustration of selected components of a prior art disk drive.

An embedded contact sensor (ECS) system includes a sensor element in the slider and ECS circuitry in the arm electronics (AE). Temperature induced resistance changes in embedded contact sensors (ECS) can be used for a variety of purposes such as:

1. Detecting slider touchdown as thermal fly-height control (TFC) power is increased. This is important for setting the correct TFC during write and read without crashing in to the disk surface.

2. Detecting contact or close proximity to the disk during otherwise normal operation, which could occur when the drive receives a mechanical shock, for example. Detection of potentially unsafe conditions allows execution of slider withdrawal procedures to place the slider in a safe position away from the disk surface.

3. Measuring slider fly-height variations around the disk to allow compensation using sector-dependent TFC settings in feed-forward TFC.

4. Disk surface defect detection and classification.

The quality of ECS system performance of these functions depends on the detector sensitivity and the ability of the ECS arm electronics (AE) to respond to the signal. The needed, ideal low noise electronics is relatively expensive to make and would occupy too much area on the AE chip, which is for example limited due to need to mount the chip on the actuator close to the slider. Therefore the ECS circuitry in the AE used in commercial drives has limited noise performance, which translates into reduced performance of the ECS system in practice.

Techniques for improving ECS amplifier performance with lower chip area and cost include, for example, dual ECS or balanced ECS. In these approaches instead of measuring the voltage across one resistor generated by a constant current, the difference in voltages between two approximately identical resistors (one in the slider and a balancing resistor in the AE) is measured. The two resistors are driven with constant currents and the voltage differential is measured using a Wheatstone bridge configuration, for example. A much better signal to noise ratio can be obtained this way for two reasons. First, when detecting signal changes around zero, rather than a large value, amplifiers with very large gains can be used, which is not possible for the single value approach. Second, the differential architecture together with the proposed biasing scheme allows amplifier designs which are easier to implement and which have lower noise.

One problem is how well the balancing resistor in the AE tracks the resistor in the slider under various slider conditions. For example, TFC heating and normal writing currents heat the ECS resistor in the slider while the on-chip reference resistor remains unchanged. Therefore, the differential signal, which was originally zero, can become quite different from zero, limiting the advantages of balanced ECS.

Embodiments of the present invention address the divergence of the differential signal, by including an additional stage in the balanced ECS design, which averages the measured signal over some time (using a low pass filter) and then samples and holds this voltage as a DC value, subtracting it from the incoming signal for a period of time to provide once again a signal close to zero. In embodiments of the invention, this adjustment is not done continuously, but is preferably in response to a signal from the system electronics channel function.

Figure 2:
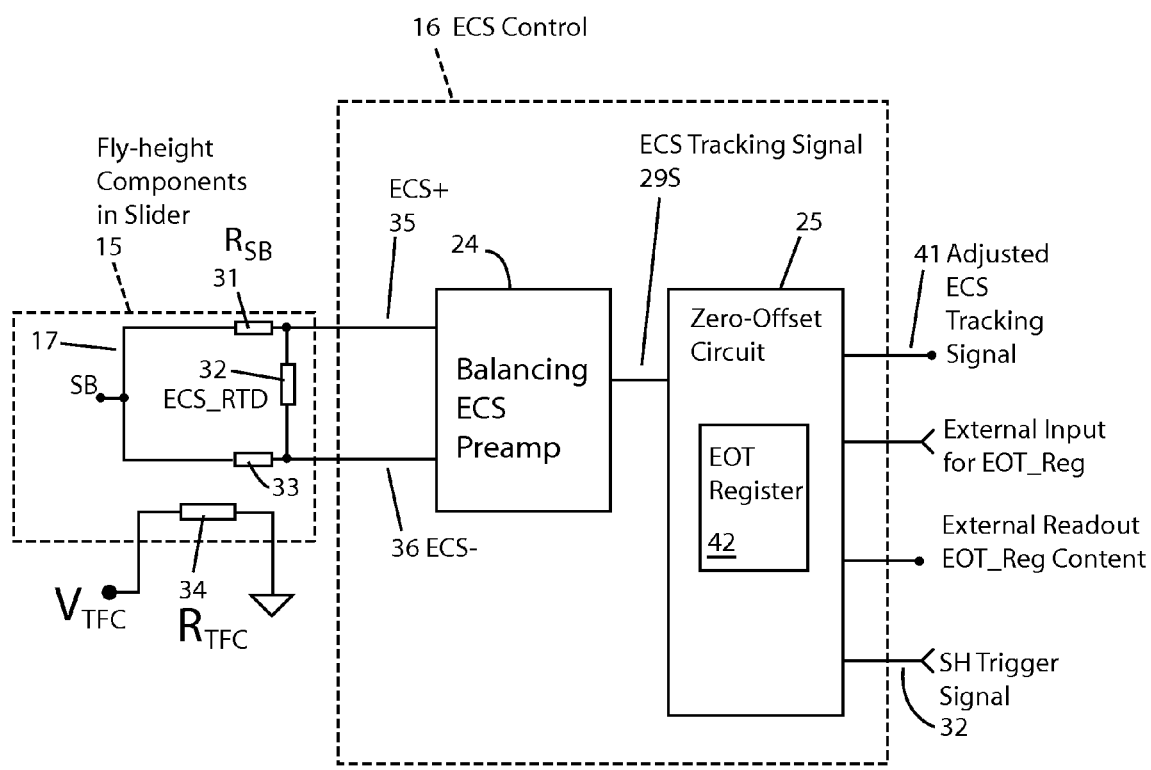
FIG. 2 a block illustration of selected components of an ECS system according to an embodiment of the invention.

FIG. 2 shows a block illustration of selected components of an ECS system according to an embodiment of the invention. The ECS Controls 16 include a balancing Embedded Contact Sensor (bECS) preamplifier 24 and Zero-offset Circuit 25.

The ECS 17 in the slider includes two slider biasing resistors ($R_{SB}$) 31, 33 which have the same resistance, much larger than the resistance of ECS_RTD. By adjusting the values of ECS+ and ECS− the slider potential (SB) can be adjusted. ECS 17 also includes resistor temperature detector ECS_RTD 32, embedded in the slider and, therefore, thermally connected to the slider body (SB). The RTD can be a thermistor and can be composed of metallic (e.g., NiFe) and semiconductor materials, for example. Changes in the resistance of ECS_RTD 32 can be used to measure changes in the local temperature of the slider body. ECS_RTD 32 is preferably located on or proximate to the air bearing surface (ABS) of slider 13. When physical contact is made between slider and the surface of the rotating disk the resulting friction causes an increase in temperature within the slider. The change in temperature resulting from the physical contact will be a gradient as a function of distance from the point of contact and, therefore, ECS_RTD 32 should be located near the ABS. The ECS_RTD 32 is electrically connected to the ECS Control Unit 16 in the AE chip by signal paths 35, 36, which will be called ECS+ and ECS−.

The ECS+ and ECS− signals are connected to bECS preamplifier 24 which provides the bias current for the ECS_RTD 32 and generates the ECS Tracking Signal 29S, which is the input to the Zero-offset Circuit 25. Zero-offset Circuit 25 generates the Adjusted ECS Tracking Signal 41 as will be further described below. The SH Trigger Signal 32 triggers the Zero-offset Circuit to sample and hold the current DC offset in the low pass filtered signal and remove that DC offset from the signal until the next trigger. The sampled value is held in EOT Register 42 (EOT_Reg). The embodiment shown in FIG. 2 allows the EOT Register 42 to be read and written by the higher components in the system, such as the channel function in the SOC. Reading the EOT Register value allows the SOC to monitor the functioning of the Zero Offset Circuit and to provide memory for the EOT Register values obtained under selected operating conditions. By writing to the EOT Register the SOC can control the operation of the Zero Offset Circuit.

Figure 3:
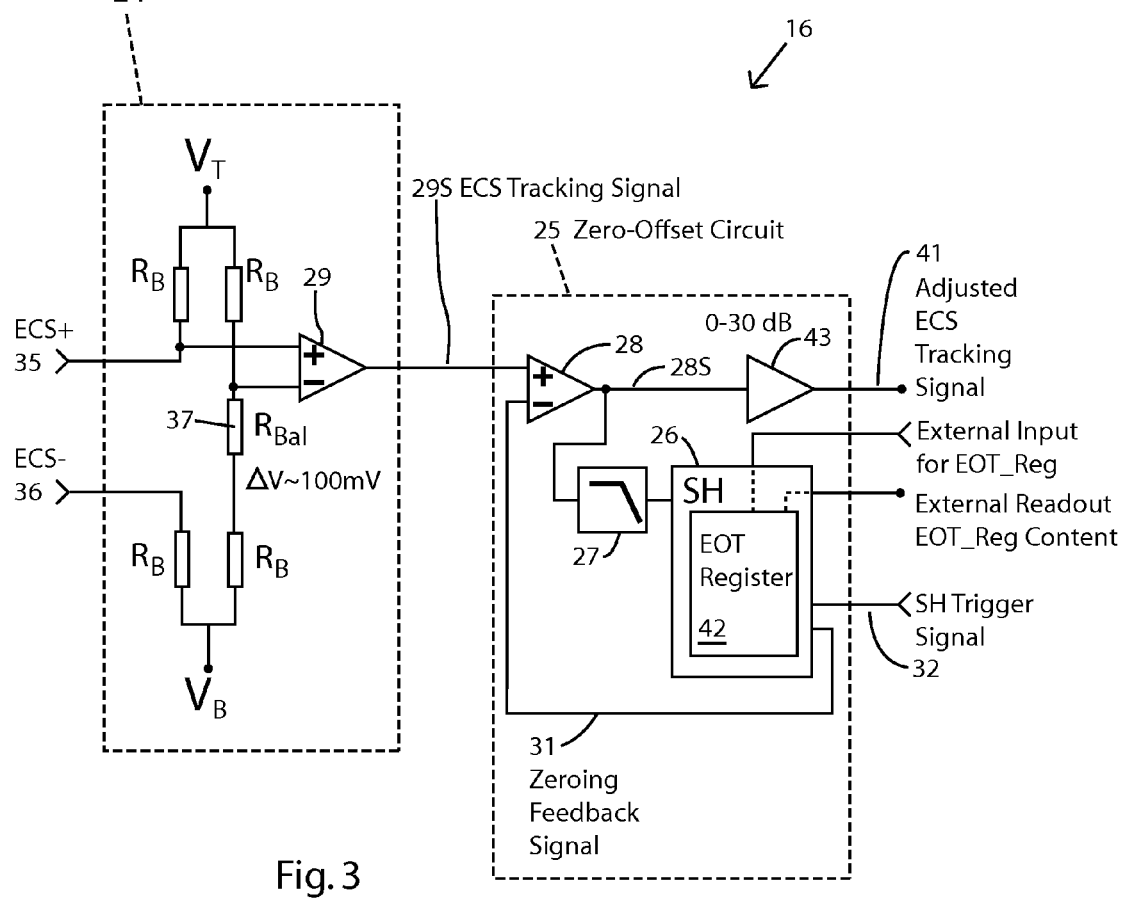
FIG. 3 a block illustration of selected components of an ECS Control unit according to an embodiment of the invention.

FIG. 3 is a block illustration of selected components of an ECS Control Unit 16 according to an embodiment of the invention. The balancing Embedded Contact Sensor (bECS) preamplifier 24 in this embodiment functions as a Wheatstone bridge configuration in which the ECS resistance, ECS_RTD 32, inside the slider, is balanced by an external resistor, R_Bal 37, inside the preamplifier.

The bias voltages V_T and V_B applied to terminals are determined using prior art techniques. (See, for example, Magnetic recording disk drive with actively controlled electric potential at the head/disk interface for wear and durability control U.S. Pat. No. 7,016,139.) The bias voltages are used both to apply an IVC (Interface Voltage Control), signal and to produce equal currents through the two arms of the bridge by using the bias resistors with the resistance R_B>>ECS_RTD, R_Bal. In principle, the balancing resistor should be equal to the ECS resistor, R_Bal=ECS_RTD, and therefore make the differential input to the first gain stage close to zero. In practice, however, many factors create an imbalance between the two resistors including slider and amplifier manufacturing tolerances, variations in ambient conditions, slider heating due to write currents, thermal flight control (TFC), and ECS bias, can produce large differences between ECS_RTD and R_Bal. The amplifier voltage supply limits the maximum gain that can occur without saturation, which will depend inversely on the resistance imbalance.

The ECS Tracking Signal Amplifier 29 in this embodiment has a gain of approximately 20-40 dB. Therefore, in order to amplify the ECS signal by 50-70 dB without saturating the amplifier, an additional offset zeroing stage (Zero-Offset Circuit 25) is used in embodiments of the invention. In the embodiment shown in FIG. 3 the Zero-Offset Circuit 25 includes analog low pass filter 27 and a sample and hold (SH) circuit 26 in a feedback loop configuration with differential unity gain amplifier 28. The low pass filter 27 filters the output of differential unity gain amplifier 28 and supplies the analog input signal for the sample and hold circuit 26. The sample and hold (SH) circuit 26 generates a DC Zeroing Feedback Signal 31 which is connected to the negative input of the differential unity gain amplifier 28. The intermediate signal 28S runs through amplifier 43 for optional further amplification (e.g. 0-30 dB) to produce the final Adjusted ECS Tracking Signal 41.

The sample and hold (SH) circuit 26 has both digital and analog components in this embodiment and, therefore, includes standard circuitry (not shown) for converting between analog and digital signals. The EOT Register 42 in this embodiment is a digital component in which the digitized sample value is held. To understand the operation of the sample and hold (SH) circuit 26, assume that initially a value of 0 is present in the EOT Register 42. At this point, the output 31 of the sample and hold circuit 26 will also be zero volts. The intermediate signal 28S is then the same as the ECS Tracking Signal 29S, i.e. no DC adjustment is being made. Similarly the Adjusted ECS Tracking Signal 41 will be an amplified version of intermediate signal 28S.

The SH circuit 26 is triggered by SH Trigger Signal 32, which is preferably generated under the control SOC's channel function firmware. Therefore, upon command, the SH circuit 26 stores the mean (i.e. low-passed) value of the ECS signal as a digital value in a register and feeds the analog DC voltage back to negative input of differential unity gain amplifier 28 which has the ECS Tracking Signal 29S as its positive input.

The SH circuit 26 input is the output of Low Pass Filter 27, which is intended to produce a mean value of the ECS signal with higher frequency components filtered out. When triggered, the SH circuit 26 stores the low-pass filtered value of the ECS signal as a digital value in the EOT Register 42. The digital value in the EOT Register is converted into an analog DC voltage (DC Zeroing Feedback Signal 31) which is fed the back to negative input of differential unity gain amplifier 28. The effect is to subtract DC signal 31 from the intermediate signal 28S which is the difference between the inputs to differential unity gain amplifier 28, which has the ECS Tracking Signal 29S as its positive input.

When the SH circuit 26 is triggered, it samples its input signal and rewrites the EOT register to hold the sampled value. At this point the output signal 41 is close to 0 because the low pass filtered input signal has been subtracted. Thus, the effect of triggering the Zero-Offset Circuit 25 is to zero out the present DC component in the ECS Tracking Signal 29S. Because the Zero-Offset Circuit 25 is only triggered on command, any additional DC offset that occurs between SH trigger signals 32 will not be cancelled out until the next trigger signal occurs. Thus, signal 28S will include the AC component of the ECS Tracking Signal 29S voltage as well as any DC ECS voltage which has appeared after the last triggered zeroing procedure. In the embodiment shown in FIG. 3, the intermediate signal 28S is further amplified (e.g. 0-30 dB) by amplifier 43 to generate the Adjusted ECS Tracking Signal 41. In this way a complete measurement of the instantaneous slider ECS resistance can be made with very high precision and repeatability during any slider task (reading, writing, touchdown, etc.).

The embodiment illustrated in FIG. 3 includes the optional means to allow EOT Register 42 to be read and written by the system. Because the value stored in the EOT Register 42 is used to generate the DC feedback signal, allowing external input to the internal register in the sample and hold circuit provides for additional control by the SOC's channel function, which has higher level knowledge of the operation of the system. Without this feature the sample and hold can be triggered to set its internal register but a value cannot be assigned to it. In some embodiments it might be beneficial for the channel to save EOT Register values for selected conditions in memory and then load them back into the EOT Register later. For example, for write and read operations the values might be different so one might choose to start with these selected default values instead of having to redo the sample and hold every time when switching from read to write and vice-versa. Also, one might want to turn off the offset compensation under certain conditions, in which case the EOT Register could be set to 0 and the trigger signal suppressed.

The time between triggers can vary significantly between embodiments and depending on the design goals for the ECS adjustment. In some embodiments the time between triggers could be as short as a few microseconds, corresponding to once or twice per sector, e.g. after each write to read and read to write transition. But in embodiments in which the design goal is only to null out changes due to environmental conditions, the triggers could be separated by minutes. Additionally, in embodiments that include the capability of the SOC to store previously measured offsets (by reading the EOT Register) and reload them back into the EOT Register at a later time, then the system might not need to re-measure at every sector. In this case re-measuring once per disk revolution (a few milliseconds) or even every few seconds might be adequate.

In embodiments of the invention, there are various events that could be selected under the control of the SOC's firmware to send the trigger ("zero") command. Sampling should not occur at arbitrary times (for example, it should not occur during read-write transitions), therefore, it is preferable that the SOC provide the trigger since SOC knows the overall state of the system including when read-write transitions occur. Initiating events could include any or all of the following:

1. Transitions from read to write or write to read, i.e. switching input/output (IO) operating mode.
2. TFC changes by more than a selected threshold value.
3. The adjusted ECS tracking signal reaches a value that indicates that the output amplifier stage is operating at or near saturation.
4. An environmental parameter such as altitude, humidity, temperature, etc. changes by more than a selected threshold value.

5. Elapsed time since last "zero" command, i.e. periodically issue the command.

The invention claimed is:

1. A disk drive comprising:
a slider with an embedded contact sensor with a first resistance electrically connected to an embedded contact sensor amplifier circuit; and
the embedded contact sensor amplifier circuit including a second resistance and producing an adjusted output signal indicative of a difference between the first resistance and a second resistance with a selected DC component removed.

2. The disk drive of claim 1 wherein the embedded contact sensor amplifier circuit includes:
a first amplifier that produces a first output signal indicative of a difference between the first resistance and a second resistance in the amplifier; and
a zero-offset circuit that uses the first output signal to generate the adjusted output signal with a selected DC component of the first output signal removed.

3. The disk drive of claim 2 wherein the zero-offset circuit sets the selected DC component upon receiving a trigger signal by sampling an intermediate signal derived from the first output signal.

4. The disk drive of claim 3 wherein the intermediate signal is produced by a differential amplifier having an output indicative of a difference between the first output signal and the selected DC component.

5. The disk drive of claim 4 wherein the zero-offset circuit includes a low pass filter and a sample and hold circuit and the low pass filter is connected to the differential amplifier output and supplies a low pass filtered signal to the sample and hold circuit, and the sample and hold circuit supplies a signal indicative of the selected DC component to a negative input of the differential amplifier.

6. The disk drive of claim 5 wherein the sample and hold circuit includes a register in which a sampled value used to generate the selected DC component is stored between trigger signals and wherein the sampled value in the register is readable by a system on a chip in the disk drive.

7. The disk drive of claim 6 wherein the register is writable by a system on chip in the disk drive to allow setting the selected DC component to a value supplied by the system on a chip.

8. The disk drive of claim 3 wherein the trigger signal is generated by a system on a chip in the disk drive.

9. The disk drive of claim 3 wherein the trigger signal is generated upon switching operating mode from read to write or from write to read.

10. The disk drive of claim 3 wherein the trigger signal is generated when thermal fly-height control changes by more than a selected threshold value.

11. The disk drive of claim 3 wherein the trigger signal is generated when the second output signal reaches a value that indicates that an output amplifier stage is operating at or near saturation.

12. The disk drive of claim 3 wherein the trigger signal is generated when a selected environmental parameter has changed by more than a selected threshold value.

13. The disk drive of claim 3 wherein the zero-offset circuit includes an amplifier to amplify the intermediate signal with the selected DC component removed to generate the adjusted output signal.

14. A disk drive comprising:
a slider with an embedded contact sensor with a first resistance electrically connected to an arm electronics chip;
a balancing preamplifier in the arm electronics chip that produces a first output signal indicative of a difference between the first resistance and a second resistance in the balancing preamplifier; and
a zero-offset circuit that includes a unity gain differential amplifier the first output signal being a positive input and a negative input being a DC signal generated by a sample and hold circuit that is connected to a low pass filter connected to an output of the unity gain differential amplifier, whereby a trigger signal to the sample and hold circuit results in a DC voltage output of the low pass filter being sampled and held and fed to the negative input of the unity gain differential amplifier until a subsequent trigger signal occurs.

15. The disk drive of claim 14 wherein the trigger signal is generated by a system on a chip.

16. The disk drive of claim 14 wherein the trigger signal is generated upon switching operating mode from read to write or from write to read.

17. The disk drive of claim 14 wherein the sample and hold circuit includes a register in which a value used to generate the DC voltage output is stored and wherein the value in the register is readable by a system on a chip in the disk drive.

18. The disk drive of claim 17 wherein the register is writable by a system on chip in the disk drive to allow setting the DC voltage output to a value supplied by the system on a chip.

19. The disk drive of claim 14 wherein the trigger signal is generated when the second output signal reaches a value that indicates that an output amplifier stage is operating at or near saturation.

20. A method of operating a disk drive having a slider with an embedded contact sensor with a first resistance comprising:
generating a first output signal indicative of a difference between the first resistance and a second resistance in a preamplifier; and
removing a selected DC voltage from the first output signal to generate an adjusted output signal, the selected DC voltage being determined when a trigger signal is sent to an embedded contact sensor circuit in an arm electronics chip, the embedded contact sensor circuit responding to the trigger signal by sampling and holding a DC voltage in a low pass filtered signal derived from the first output signal and generating the adjusted output signal with the DC voltage removed until a subsequent trigger signal occurs.

\* \* \* \* \*